(12) United States Patent
Iijima

(10) Patent No.: US 8,166,417 B2
(45) Date of Patent: Apr. 24, 2012

(54) DISPLAY CONTROL APPARATUS AND CONTROL METHOD THEREOF

(75) Inventor: Tadahiko Iijima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 596 days.

(21) Appl. No.: 11/276,283

(22) Filed: Feb. 22, 2006

(65) Prior Publication Data

US 2006/0197751 A1   Sep. 7, 2006

(30) Foreign Application Priority Data

Mar. 2, 2005   (JP) ................................. 2005-057962

(51) Int. Cl.
*G06F 3/048* (2006.01)

(52) U.S. Cl. ......... 715/802; 715/768; 715/790; 715/797

(58) Field of Classification Search .................. 715/768, 715/802, 790, 797, 856–859
See application file for complete search history.

(56) References Cited

U.S. PATENT DOCUMENTS

| | | | | |
|---|---|---|---|---|
| 4,783,648 A * | 11/1988 | Homma et al. | ............... | 715/794 |
| 4,819,189 A * | 4/1989 | Kikuchi et al. | ............... | 715/797 |
| 5,046,001 A * | 9/1991 | Barker et al. | ................. | 715/794 |
| 5,298,890 A * | 3/1994 | Kanamaru et al. | ............ | 345/157 |
| 5,671,379 A * | 9/1997 | Kuse et al. | ..................... | 715/805 |
| 5,841,436 A * | 11/1998 | Nakamura | ..................... | 715/790 |
| 5,874,936 A * | 2/1999 | Berstis et al. | .................. | 715/785 |
| 6,246,407 B1 * | 6/2001 | Wilks et al. | ................... | 715/803 |
| 6,429,883 B1 * | 8/2002 | Plow et al. | ..................... | 715/768 |
| 6,512,529 B1 * | 1/2003 | Janssen et al. | ................ | 715/790 |
| 6,587,128 B2 * | 7/2003 | Kanevsky et al. | ............ | 715/768 |
| 6,961,906 B2 * | 11/2005 | Hansen et al. | ................. | 715/767 |
| 2006/0294475 A1 * | 12/2006 | Holecek et al. | ............... | 715/781 |

FOREIGN PATENT DOCUMENTS

| | | |
|---|---|---|
| JP | 08-314681 | 11/1996 |
| JP | 11-249782 | 9/1999 |
| JP | 02003-022177 | 1/2003 |
| JP | 2004-220235 | 8/2004 |

* cited by examiner

*Primary Examiner* — Chat Do
*Assistant Examiner* — Phenuel Salomon
(74) *Attorney, Agent, or Firm* — Fitzpatrick, Cella, Harper & Scinto

(57) ABSTRACT

In a case where a display control apparatus displays images A and B from respective PCs, a positioning operation using a positional device is started in an area of image A and continuously preformed in the area of that image. The apparatus determines whether or not a position designated in the area of image A has a predetermined positional relationship with an area of image B, partly covering the image A. If it is determined that the designated position has the predetermined positional relationship with the area of image B, the apparatus makes image B transparent. The apparatus then issues coordinates data indicating the designated position in the area of image B, to the PC for outputting image A.

18 Claims, 9 Drawing Sheets

DISPLAY CONTROL APPARATUS AND CONTROL METHOD THEREOF

FIELD OF THE INVENTION

The present invention relates to a display control apparatus for controlling display on a display unit that can display multiple windows (sometimes referred to herein as "multi-windows"), as well as a control method for the display control apparatus.

BACKGROUND OF THE INVENTION

Some conventional display units for conference or the like comprise a coordinates inputting function such as a digitizer or a touch panel which enables coordinates data to be input to a personal computer connected to the display unit. The display unit can also be used as a pointing device to input, to the personal computer, coordinates data on a position on a screen which is designated by a user using a pen or a finger. This enables a cursor displayed on the display unit to be moved to a designated position on the screen of the display unit. Further, by operating switches, corresponding to mouse buttons, provided on the pen, or touching the screen, it is possible to input button operation information to the personal computer.

Some display units comprise a plurality of video input terminals, any of which can be selected using buttons or the like so that video signals to be displayed on the screen can be input through the selected terminal. Other display units comprise a picture-in-picture function and/or a picture-out-picture function that enable a plurality of the video input terminals to be simultaneously selected using buttons or the like so as to provide simultaneous display of video signals from the selected video input terminals on the screen. The picture-in picture-function displays sub-screens in a main screen. The picture-out-picture function instead reduces the size of the main screen and displays sub-screens in free spaces outside the main screen.

A display unit has also been proposed in which video outputs from different personal computers (PCs) can be connected to a plurality of the video input terminals of the display unit and displayed in multi-windows, each corresponding to a respective PC, using the picture-in picture-function or picture-out-picture function. With some of these display units, when a position on the screen is designated using a pen or the finger, a positional signal is sent to the personal computer that is outputting a video displayed at the designated position so that the screen displayed by the personal computer (PC) can be operated by the display unit (see Japanese Patent Application Laid-Open No. 2003-22177).

A display unit comprises a coordinates inputting function such as a digitizer or a touch panel which enables a plurality of areas to be simultaneously operated. With this function, different personal computers (PCs) can be connected to the respective video input terminals of the display unit, and the display unit displays videos corresponding to the various PCs, using the picture-in-picture function or picture-out-picture function. Each of the PCs can then be operated by designating the main screen or the sub-screen of the display unit using the pen or finger.

A window control method has also been proposed which is applied to, for example, an operation system composed of a multi-window system. In this method, in a case where windows are displayed so as to overlap, a particular window is made transparent so as to enable inputs to another particular (hidden) window and its operations to the window (see Japanese Patent Application Laid-Open No. 11-249782).

A problem with the former Japanese Patent Application Laid-Open No. 2003-22177 is that if windows overlap, inputs cannot be given to an area of an underlying hidden window. A problem with the window control method in the latter Japanese Patent Application Laid-Open No. 11-249782 is that if the overlying window is made transparent to enable inputs to the underlying hidden window, inputs cannot be given to the transparent window. Further, even if inputs can be simultaneously given to a plurality of positions of a window, inputs can be given only to the underlying window (nontransparent window) if a plurality of windows overlap.

SUMMARY OF THE INVENTION

An object of the present invention is to solve the disadvantages of the conventional art.

The feature of the present invention is able to input to a hidden window area, even if a window to be operated is hidden by another window during a positioning operation.

According to the present invention, there is provided a display control apparatus for controlling a display on a screen of a display unit, comprising discriminating means for discriminating a designated position on the screen of the display unit, issue means for determining a window containing the designated position discriminated by the discriminating means and issuing coordinates data indicating the designated position on the window, judgment means for judging whether or not, while a continuous positioning operation started in a first window and is being performed in the first window, the designated position discriminated by the discriminating means has a predetermined positional relationship with a second window partly covering the first window, display change means for changing a displaying state of the second window in a case where the judgment means judges that the designated position discriminated by the discriminating means has the predetermined positional relationship with the second window, and means for issuing, to the first window, coordinates data indicating the designated position discriminated by the discriminating means in the second window having the displaying state changed by the display change means.

Further, according to the present invention, there is provided a display control method for controlling a display on a screen of a display unit, the method comprising discriminating a designated position on the screen of the display unit, judging a window to which the position discriminated in the discriminating step belongs and issuing coordinates data indicating the position to the window, judging whether or not, while a continuous positioning operation started in a first window and is being performed in the first window, the position discriminated in the discriminating step has a predetermined positional relationship with a second window partly covering the first window, changing a displaying state of the second window in a case where it is judged in the judgment step that the position discriminated in the discriminating step has the predetermined positional relationship with the second window, and issuing, to the first window, coordinates data indicating the position discriminated in the discriminating step in the second window having the displaying state changed in the display change step.

The feature can be achieved by combining characteristics set forth in the independent claims. The dependent claims specify further advantageous specific examples.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

The preferred embodiments of the present invention will be hereinafter explained in detail with reference to the accompanying drawings. Note that the embodiments described below do not limit the claimed invention, and all combinations of characteristics explained in these embodiments are not always essential for practicing the invention.

Figure 1:
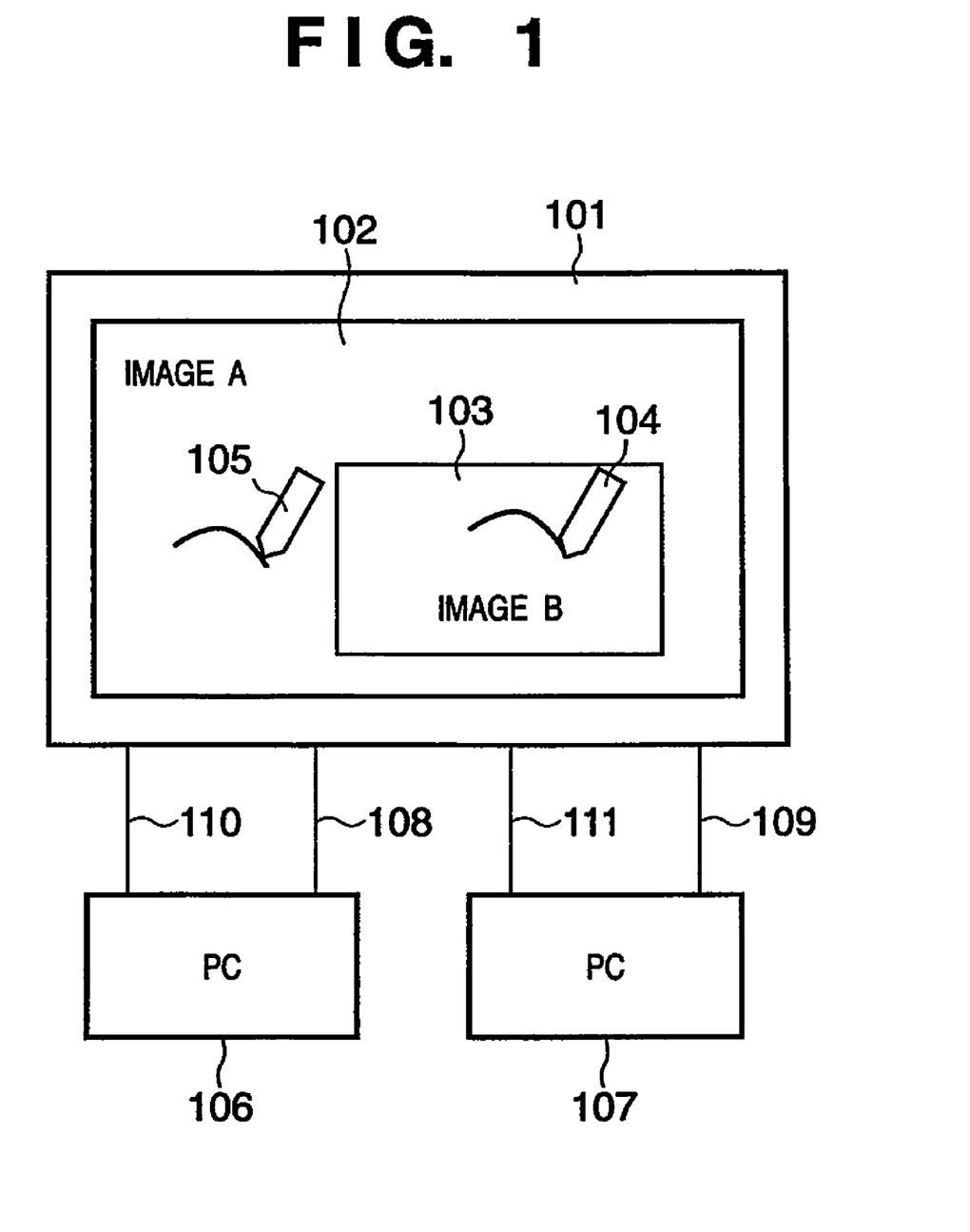
FIG. 1 is a diagram illustrating an image display system including an image display unit with a coordinates input function in accordance with an embodiment of the present invention.

FIG. 1 is a diagram illustrating an image display system including an image display unit 101 with a coordinates input function (simply referred to as a "display unit" below) in accordance with an embodiment of the present invention.

In the figure, a video signal from a PC (personal computer) 106 is input to the display unit 101 via a video cable 110. A video signal from a PC 107 is also input to the display unit 101 via a video cable 111. The PCs 106 and 107 are connected to the display unit 101 via USB cables 108 and 109, respectively.

An image A 102 is displayed on the basis of a video signal input from the PC 106 via the video cable 110. An image B 103 is displayed on the basis of a video signal input from the PC 107 via the video cable 111. The image B 103 is displayed so as to cover (overlap) a part of the image A 102. Coordinates data on a position designated on the image A 102 is supplied to the PC 106 via the USB cable 108. Similarly, coordinates data on a position designated on the image B 103 is supplied to the PC 107 via the USB cable 109. Reference numerals 104 and 105 denote input pens used to point at positions on the images B 103 and A 102, respectively.

In the embodiment, the coordinates data is supplied to each PC via the USB cable. However, the present invention is not limited to the USB. Radio may be used provided that it enables coordinates data to be transmitted to the PCs.

Figure 2:
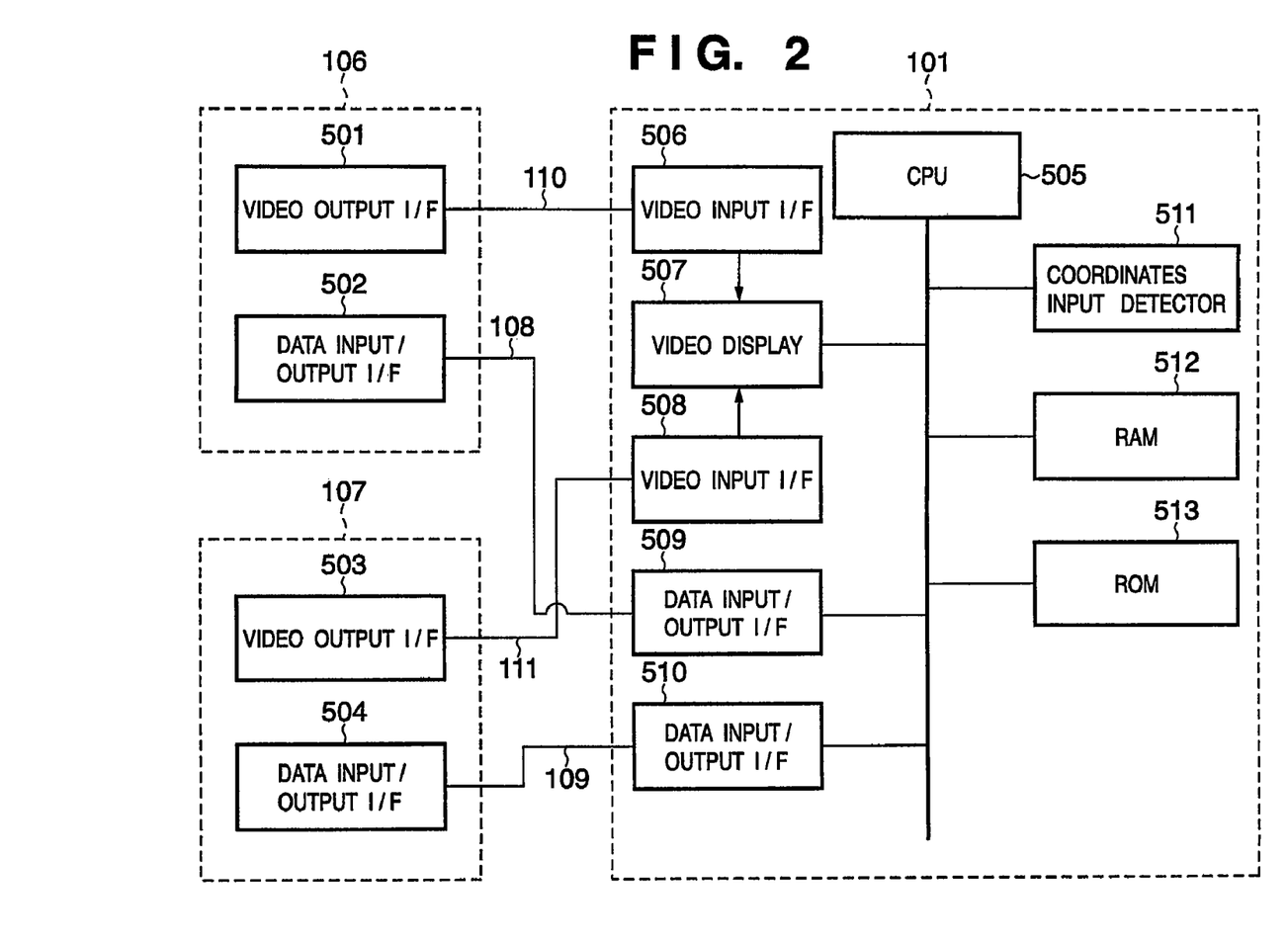
FIG. 2 is a block diagram illustrating the functional configuration of the image display system in accordance with the present embodiment.

FIG. 2 is a block diagram illustrating the functional configuration of the image display system in accordance with the present embodiment. In this figure, the parts also shown in FIG. 1 are denoted by the same reference numerals as in the latter Figure.

In FIG. 2, the PC 106 comprises a video output I/F 501 that outputs video signals to the display unit 101 via the video cable 110 and a data input/output I/F 502 which inputs and outputs data to/from the display unit 101 via the USB cable 108. Likewise, the PC 107 comprises a video output I/F 503 that outputs video signals to the display unit 101 via the video cable 111 and a data input/output I/F 504 which inputs and outputs data to/from the display unit 101 via the USB cable 109.

The display unit 101 receives a video signal from the video cable 110 through a video input I/F 506 and receives a video signal from the video cable 111 through a video input I/F 508. A video display 507 has a display panel. Video signals from the video input I/F 506 and the video input I/F 508 are input to the video display 507, which then displays them in accordance with instructions from a CPU 505. A data input/output I/F 509 transmits and receives coordinates data or device data to and from the PC 106. A data input/output I/F 510 transmits and receives coordinates data or device data to and from the PC 107. The CPU 505 controls the operation of the entire display unit 101 in accordance with control programs stored in a ROM 513 so that the CPU 505 controls the input and output of various data and processes the data and controls to display on the video display 507. A coordinates detector 511 detects the coordinates of a designated position on the screen as well as a state of button of the input pen. A RAM 512 is used as a work area during a control operation performed by the CPU 505, to temporarily store various calculations, coordinates data, and the like. The ROM 513 stores programs and various data required to execute control in accordance with the present embodiment.

In this configuration, when, for example, the pen is used to specify a position on the screen on which an image is being displayed by the video display 507, the display unit 101 uses the coordinates detector 511 to determine the coordinates of the designated position. If the image is being displayed on the basis of a video signal from the PC 106, the detected coordinates data is transmitted from the input/output I/F 509 to the data input/output 502 of the PC 106. The PC 106 thus converts the input coordinates data into a video signal corresponding to an image from the PC 106. The PC 106 then transmits the video signal from the video output I/F 501 to the video input I/F 506, so that the display unit 101 changes an image in accordance with an operation of the pen and displays the changed image on the video display 507. This also applies to the PC 107, and the description of a process for the PC 107 will be omitted. Under the control of the CPU 505, the video display 507 changes the size, position, display/non-display, and the like of an image and displays the image on the basis of the video signal input by the video input I/F 506 and 508. The video display 507 thus synthesizes input video signals and displays images.

First Embodiment

Figure 3:
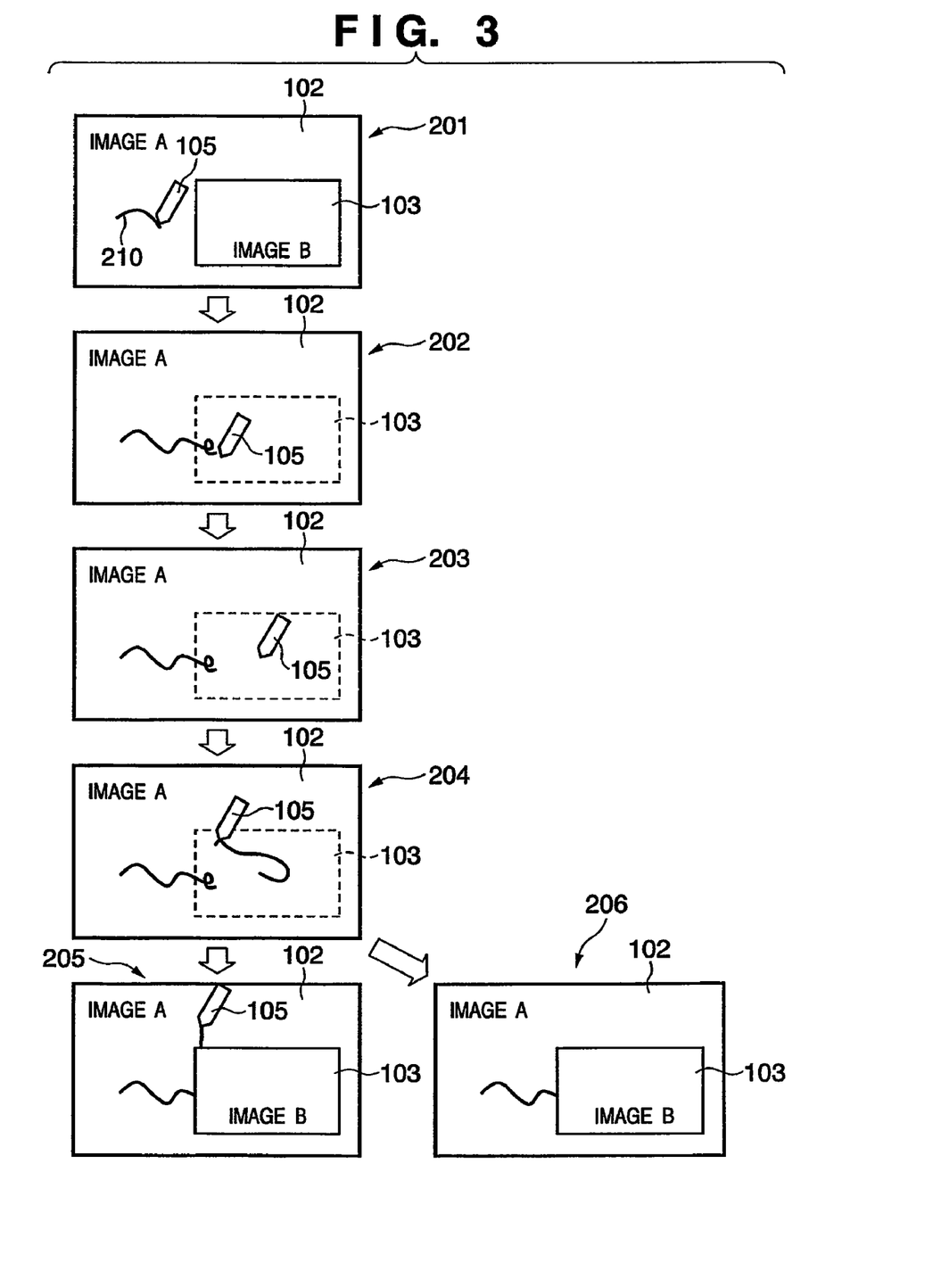
FIG. 3 depicts a view illustrating an operation in accordance with a first embodiment of the present invention.

FIG. 3 depicts a view illustrating an operation in accordance with a first embodiment of the present invention. The operation of the first embodiment will be described with reference to FIG. 3.

In 201, the pen 105 is used to perform a positioning operation on an area of image A 102 based on a video signal from the PC 106. The coordinates detector 511 detects the position designated using the pen 105 and transmits the corresponding coordinates data to the PC 106 via the data input/output I/F 509. The PC 106 receives and processes the coordinates data; in a line drawing mode, the PC 106 draws a line 210 on the basis of the coordinates data. An image of the line 210 is input to the video input I/F 506 as a video signal and then displayed on the video display 507.

In 202, the position continuously designated using the pen 105 enters an area of image B 103. At the moment, the image B 103 is changed to be transparent, i.e., the full image A can be viewed. The coordinates data designated using the pen 105 is being transmitted to the PC 106 even though the position designated using the pen 105 has entered the area of image B 103. Description will be given later of judgment about whether or not the position designated using the pen 105 has entered the area of image B 103. As shown in 202 to 204, while designation of positions using the pen 105 is being continuously implemented, items of the coordinates data designated using the pen 105 are continuously transmitted to the PC 106, with the image B 103 kept transparent.

If the position designated using the pen 105 is located outside the area of image B 103 as shown in 205, the image B 103 is visualized and returned to its original display form (displaying state). When the continuous positioning operation with the pen 105 is terminated as shown in 206, the image B 103 is visualized and returned to its original display form.

Description will be given later of judgment of whether or not the position designated using the pen 105 has left the area of image B 103, as in the case of the judgment of whether the position has entered the image. Two judgment methods described below are used to determine whether or not a continuous positioning operation is being performed using the input pen. A first judgment method (method 1) judges that a continuous positioning operation is being performed when a position is designated within a preset time period after the last positioning operation and judges that the continuous positioning operation has ended if no inputs are given for the preset time period. A second judgment method (method 2) judges that the continuous positioning operation has ended if the distance between the latest pen up position and the current designated position is larger than a preset value. Any one of the continuous-operation determining methods 1 and 2 may be employed, or both of them may be employed so as to determine whether or not a continuous positioning operation is terminated.

Figure 4:
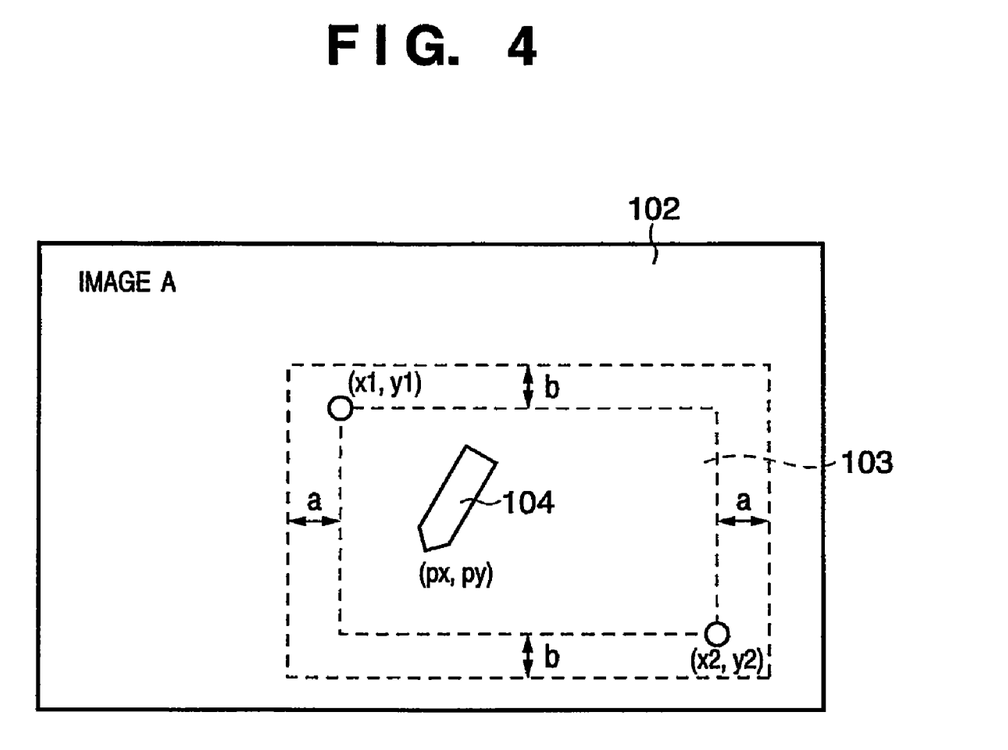
FIG. 4 is a diagram illustrating judgment conditions used to determine whether or not a position designated using a pen is present within an image B.

FIG. 4 is a diagram illustrating judgment conditions used to determine whether or not a position designated using the pen is present within the area of image B 103.

The upper left position of the area of image B 103 is defined as (x1, y1) and its lower right position is defined as (x2, y2). The position designated using the pen 104 is expressed as (px, py). If (x1−a)<px<(x2+a) and (y1−b)<py<(y2+b), then the CPU 505 judges that the position designated using the pen 104 is inside the image B 103. Reference characters a and b denote preset values that may be different or the same.

Figure 5:
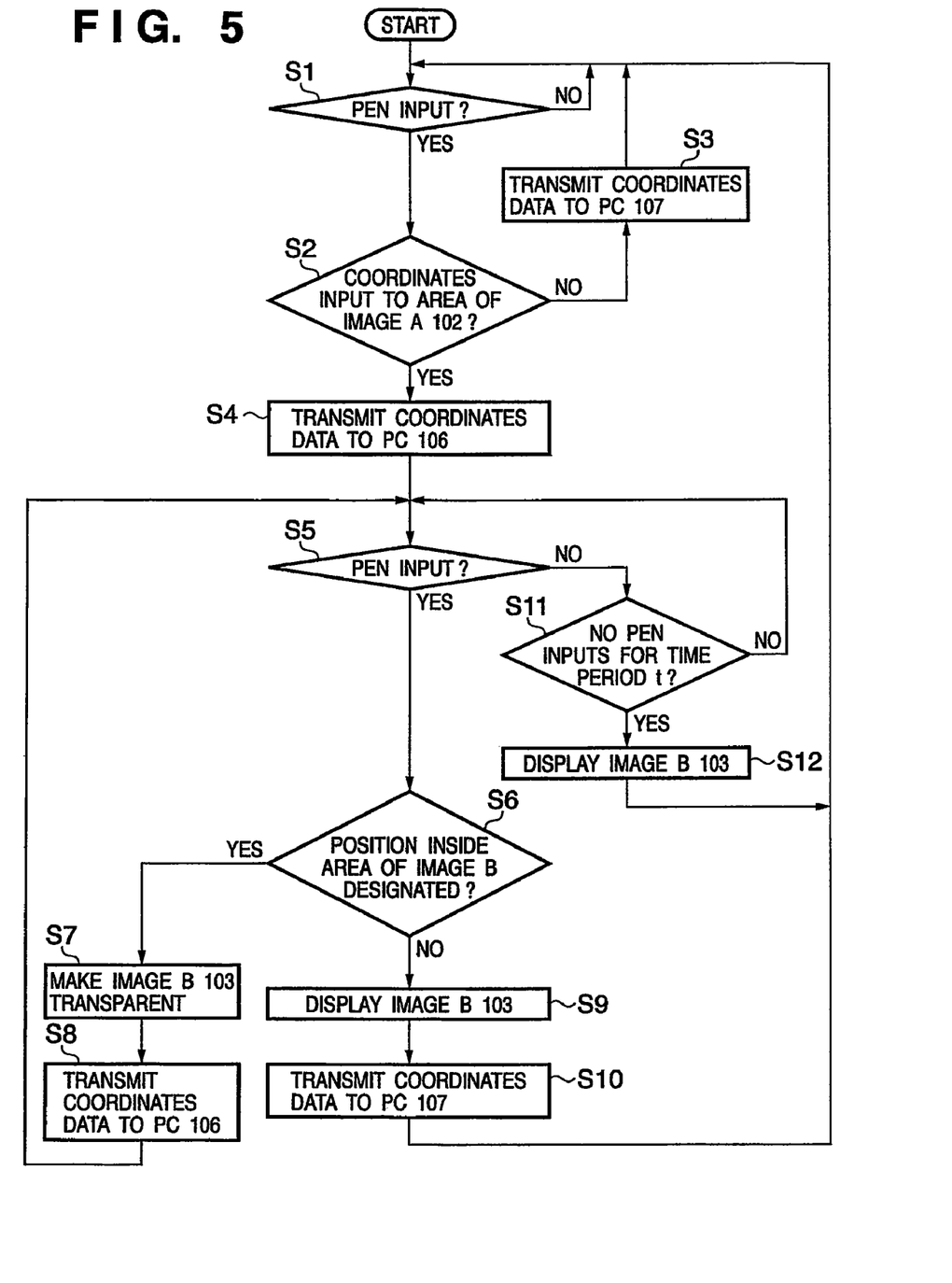
FIG. 5 is a flowchart illustrating a process executed by a display unit in accordance with the first embodiment of the present invention.

FIG. 5 is a flowchart illustrating a process executed by the display unit 101 in accordance with the first embodiment of the present invention. The figure shows the use of the first continuous operation determining method (method 1). A program that executes this process is stored in the ROM 513 and executed under the control of the CPU 505.

First, in step S1, the CPU 505 determines whether or not any input has been given using the pen. If any input has been given, the process proceeds to step S2 where the CPU 505 judges whether or not the pen input is done within an area of image A 102. If the pen input is not done within the area of image A 102, the process proceeds to step S3. The CPU 505 then judges that the input corresponds to an area of image B 103 and transmits the coordinates data designated using the pen to the PC 107 corresponding to the image B 103. The process returns to step S1.

In step S2, if the pen input corresponds to the inside of the image A 102, the process proceeds to step S4. The CPU 505 transmits the coordinates data designated using the pen 105 to the PC 106, corresponding to the image A 102. Then in step S5, the CPU 505 determines whether or not any further position has been designated using the pen 105. If further position has been designated using the pen 105, the process proceeds to step S6. The CPU 505 then judges whether or not the designated position is within the area of image B 103. This judgment is made on the basis of the judgment conditions shown in FIG. 4. If the CPU 505 judges that the designated position is inside the area of image B 103, the process proceeds to step S7 where the CPU 505 makes the image B 103 transparent. In step S8, the CPU 505 transmits the designated coordinates data to the PC 106. The process then proceeds to step S5. This enables a continuous positioning operation to be input to the area of image A 102 without being obstructed by the image B 103, as shown by 202 to 204 in FIG. 3, previously described.

If the CPU 505 judges in step S6 that the position designated by using the pen 105 is outside of the area of image B 103, the process proceeds to step S9 where the CPU 505 displays the image B 103 (205 in FIG. 3). In step S10, the CPU 505 transmits the designated coordinates data to the PC 107 corresponding to the image B.

In step S5, if no positioning operation has been performed using the input pen, the process proceeds to step S11. The CPU 505 then judges whether no positioning operation with the pen has been performed for a predetermined time period t. In step S11, if the predetermined time period t has not elapsed yet, then the process returns to step S5 where the CPU 505 executes the above process. However, if the predetermined time period t has elapsed, then the process proceeds to step S12 where the CPU 505 visualizes and displays the image B 103 in its original form (displaying state as 206 in FIG. 3). The process then returns to step S1.

Figure 6:
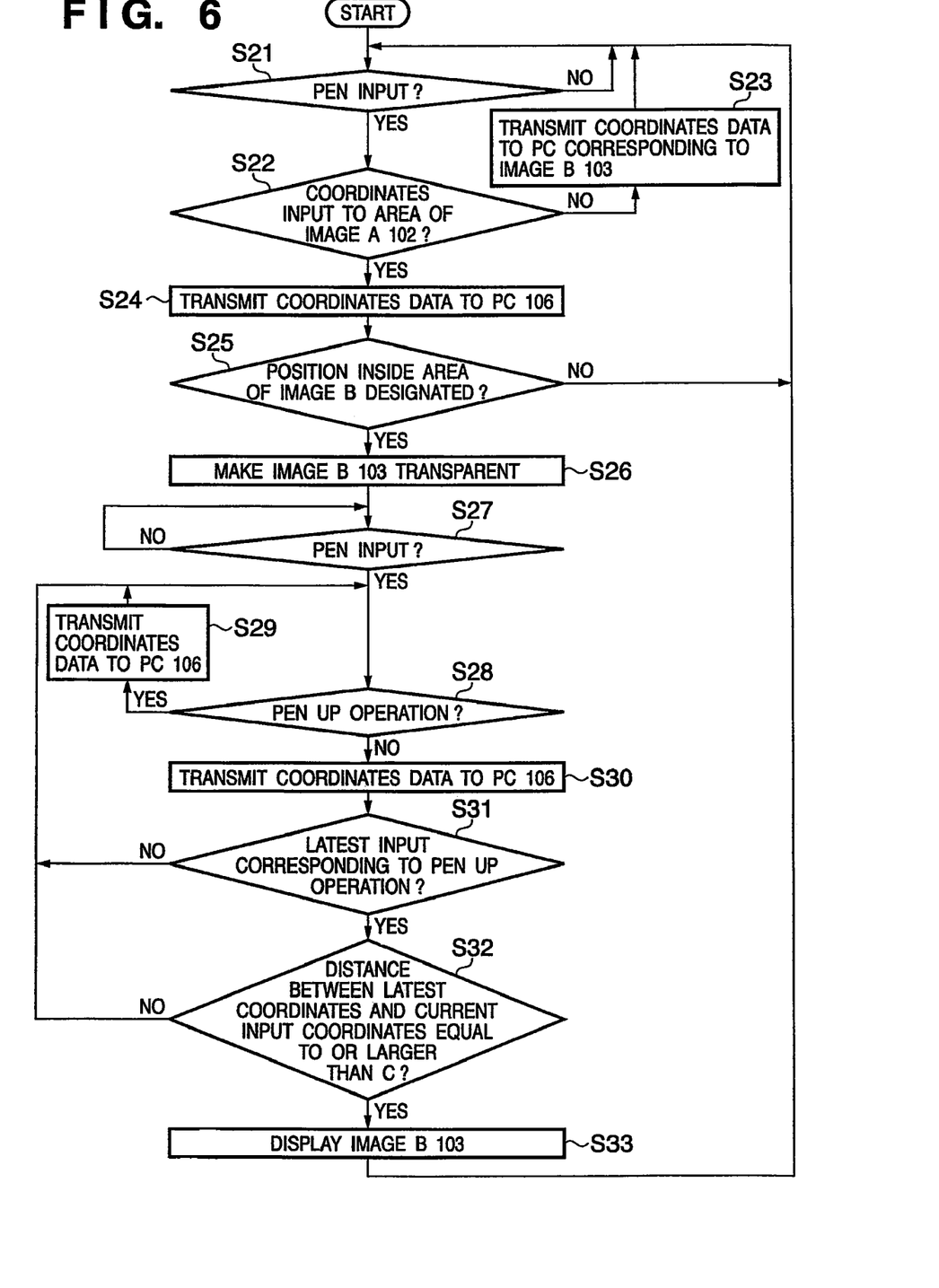
FIG. 6 is a flowchart illustrating another example of a process executed by the display unit in accordance with the first embodiment of the present invention.

FIG. 6 is a flowchart illustrating another example of a process executed by the display unit 101 in accordance with the first embodiment of the present invention. In this case, the second continuous operation determining method (method 2) described above is used. A program that executes this process is stored in the ROM 513 and executed under the control of the CPU 505.

The processing in steps S21 to S24 is the same as that in steps S1 to S4 in FIG. 5 and will be omitted from the following description.

In step S25, the CPU 505 judges whether or not the position designated using the pen is contained in the area of image B 103. The judgment is made on the basis of the judgment conditions in FIG. 4 described above. If the CPU 505 judges that the designated position is not the inside of the area of image B 103, the process returns to step S21. However, if the CPU 505 judges that the designated position is within the area of image B 103, the process proceeds to step S26. The CPU 505 then makes the image B 103 transparent. Next in step S27, the CPU 505 determines whether or not any designation using the pen has been input. If any designation has been input, the process proceeds to step S28 where the CPU 505 judges whether or not the designation corresponds to a pen-up operation. If the designation corresponds to a pen-up operation, then the process proceeds to step S29 where the CPU 505 transmits the status of pen-up and the coordinates data designated using the pen, to the PC 106 corresponding to the image A. The process proceeds to step S28.

In step S28, if the next pen input is not a pen-up operation, then the process proceeds to step S30 where the CPU 505 transmits the coordinates data to the PC 106. In step S31, the CPU 505 judges whether or not the last input using the pen corresponds to a pen-up operation. If the last input operation corresponds to a pen-up operation, then the process proceeds to step S32. The CPU 505 then judges whether or not the distance between the last input position and the current input position is larger than a preset value C. If the CPU 505 judges that the distance is larger than the preset value C, then the process proceeds to step S33. The CPU 505 then displays the image B 103 (nontransparent). If the judgment is "No" in steps S31 and S32, then the process returns to step S28 where the CPU 505 executes the above processing.

In step S27, if no pen input has been given, step S27 is repeated. However, the CPU 505 may judge whether no pen input has been input for a predetermined time period and execute the corresponding process as in the case of steps S5 and S11 in FIG. 5 described above.

With reference to the flowcharts in FIGS. 5 and 6, description has been given of the case where the image B 103 is made transparent if the position continuously designated using the pen 105 has entered the area of image B 103. However, for example, the CPU 505 may make the image B 103 transparent by determining that the distance between the position designated using the pen and the area of image B 103 is less than a predetermined value.

In the above description, the image B 103 is made transparent in steps S7 and S26. However, the color of the image may be changed to be lighter or thin, or the image may be patterned.

In the above example, the image B 103 is made transparent with the image A 102 used as a main image. However, reversely, the image A 102 can be made transparent with the image B 103 used as a main image.

For example, the following case will be considered: in a case that a plurality of windows are displayed so that the underlying (under) window is partly hidden by the overlying (above) window, an operation such as drawing is performed on the underlying window using a positioning device (pen or the like). In a case that the first embodiment is applied to this case, if the position designated using the positioning device nears the hidden area, the overlying (above) window becomes transparent. The user can then continue the drawing while viewing the otherwise hidden underlying window. The overlying (above) window is then visualized when the position designated using the positioning device leaves the otherwise hidden area or when the continuous positioning operation using the positioning device is finished. This also enables the user to perform an operation on the overlying (above) window using the positioning device.

Second Embodiment

Figure 7:
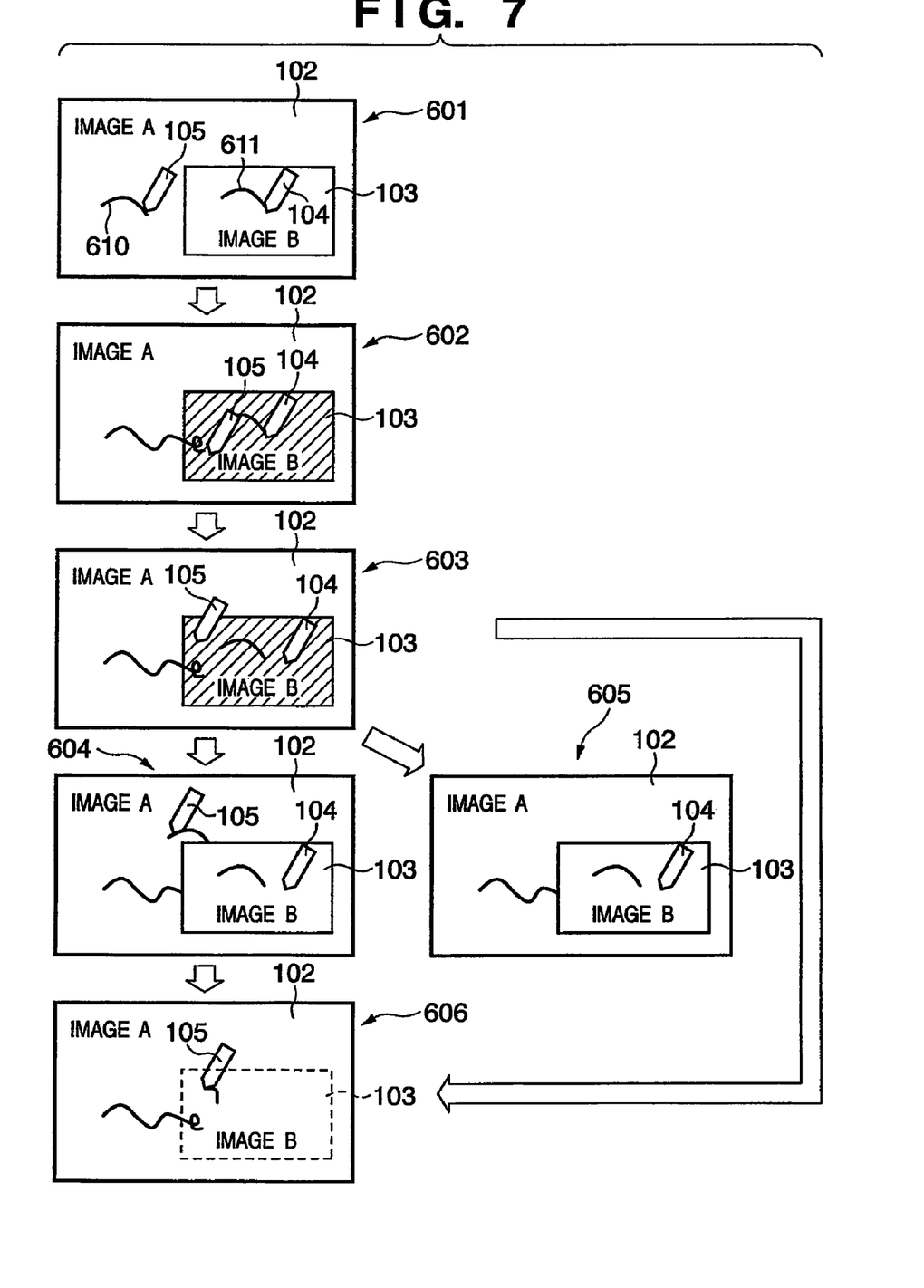
FIG. 7 is a view illustrating an operation in accordance with a second embodiment of the present invention.

FIG. 7 is a diagram illustrating an operation in accordance with a second embodiment of the present invention. The operation of the second embodiment will be described below with reference to FIG. 7. The display system in accordance with the second embodiment has the same configuration as that in the first embodiment described above and will not be described below.

In 601, the pen 105 is being used to perform a positioning operation on the area of image A 102 based on a video signal from the PC 106, while the pen 104 is being operated on the area of image B 103. In this case, the coordinates detector 511 detects the coordinates of positions designated using the pens 105 and 104. The coordinates detector 511 then transmits the respective coordinates data to the PC 106 and 107 via the data input/output I/Fs 509 and 510. The PCs 106 and 107 thus process the corresponding coordinates data; in the line drawing mode, lines 610 and 611 are drawn on the basis of the coordinates data and input to the video input I/Fs 506 and 507, respectively, as video signals. The lines 610 and 611 are thus displayed on the video display 507.

In 602, the position continuously designated using the pen 105 enters the area of image B 103. The image B 103 is then made translucent. Although the position designated using the pen 105 is inside the area of image B 103, the coordinates data designated using the pen 105 is transmitted to the PC 106. On this occasion, the coordinates data designated using the pen 104 being continuously operated is transmitted to the PC 107. Whether or not the position designated using the pen 105 has entered the area of image B 103 is made as described above. Thus, as shown in 602 and 603, while the positions are respectively being continuously designated using the pens 104 and 105, the coordinates data designated using the pens 104 and 105 is respectively continuously transmitted to the corresponding PCs 106 and 107 with the image B 103 kept translucent.

Then, as shown in 604, if the position designated using the pen 105 is located outside the area of image B 103, the image B 103 is visualized and returned to its original display form. As shown in 605, the image B 103 is also visualized and returned to its original display form when the continuous positioning operation using the pen 105 is finished.

Reference numeral 606 shows the end of continuous positioning operation of using the pen 104 to designate a position inside the area of image B 103. In this case, the image B 103 is made transparent as in the case of the first embodiment described above. Even if the position designated using the pen 105 has entered the area of image B 103, the coordinates data designated using the pen 105 is transmitted to the PC 106.

Whether or not a continuous positioning operation is being performed is determined using the above first and second judgment methods. The first judgment method (method 1) judges that a continuous positioning operation is being performed when a position is designated within a preset time period after the last positioning operation and judges that the continuous positioning operation has ended if no operational inputs are given for the preset time period. The second judgment method (method 2) judges that the continuous positioning operation has ended if the distance between the latest pen up position and the current designated position is larger than a preset value. It is possible to use both the first and second determining methods rather than selecting one of them.

Figure 8:
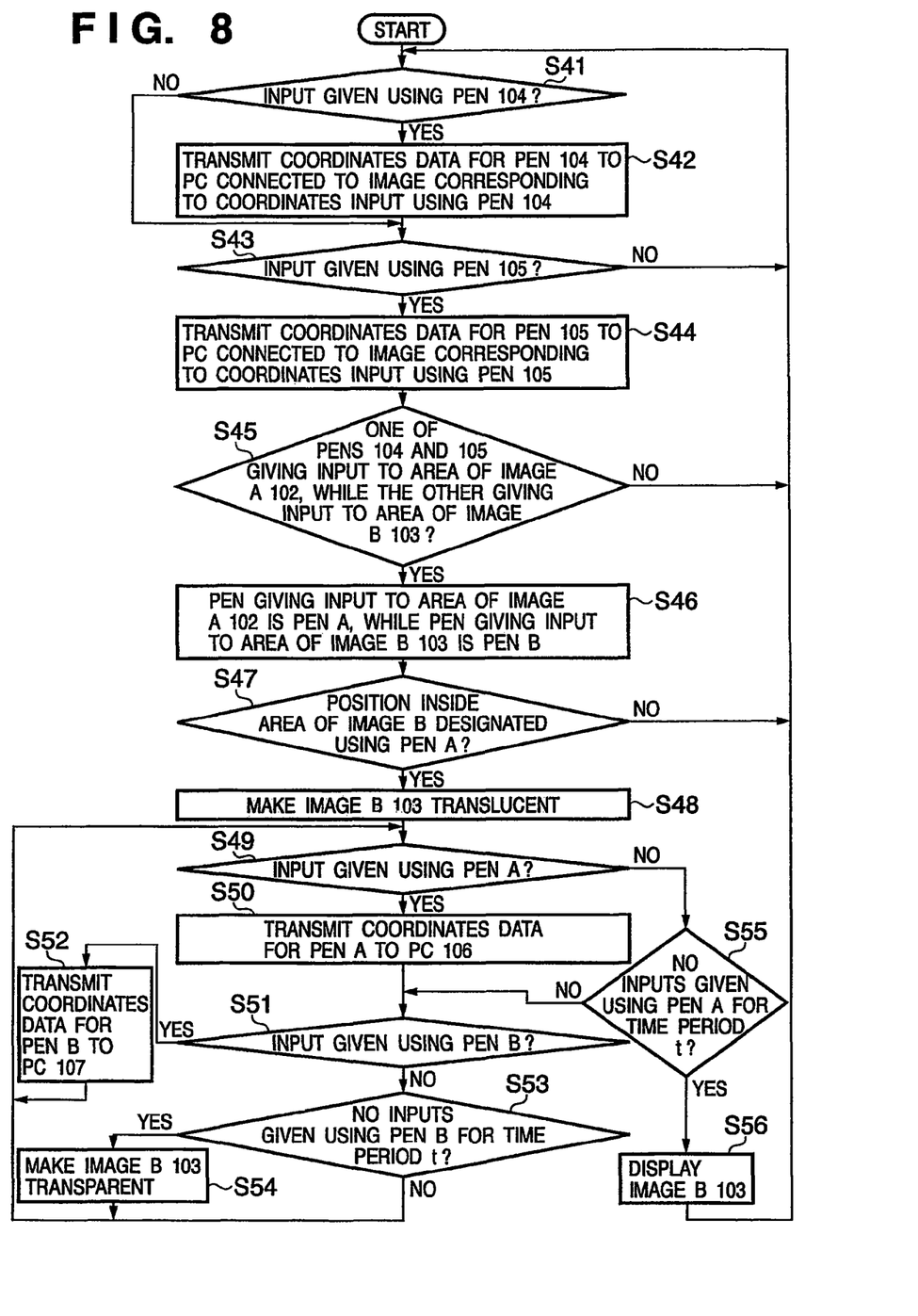
FIG. 8 is a flowchart illustrating an example of a process executed by a display unit in accordance with the second embodiment of the present invention.

FIG. 8 is a flowchart illustrating an example of a process executed by the display unit 101 in accordance with the second embodiment of the present invention, showing the case where the above-descried first judgment method 1 is used. A program that executes this process is stored in the ROM 513 and executed under the control of the CPU 505.

First, in step S41, the CPU 505 judges whether or not any position has been designated using the pen 104. If no positions have been designated, the process proceeds to step S43. However, if any position has been designated, the process proceeds to step S42 where the CPU 505 transmits the coordinates data to the PC 107 corresponding to the image B 103 corresponding to the position input using the pen 104. In step S43, the CPU 505 similarly checks whether or not any input has been given using the pen 105. If any input has been given, then the process proceeds to step S44 where the CPU 505 transmits the coordinates data to the PC 106 corresponding to the image A 102 corresponding to the position input using the pen 105.

In step S45, the CPU 505 determines whether or not one of the positions input using the two pens 104 and 105 corresponds to the area of image A 102, whereas the other corresponds to the area of image B 103. If one of the input positions corresponds to the area of image A 102, whereas the other corresponds to the area of image B 103, the process proceeds to step S46. The pen designating the position on the image A 102 is defined as a pen A. The pen designating the position on the image B 103 is defined as a pen B. If the judgments in steps S43 and S45 are "NO" the process returns to step S41.

In step S47, the CPU 505 judges whether or not the position designated using the pen A is inside the area of image B 103. If the position is not within the area of image B 103, the process returns to step S41. However, if the designated position is inside the area of image B 103, the process proceeds to step S48 where the CPU 505 makes the image B 103 translucent (602 in FIG. 7).

Figure 9:
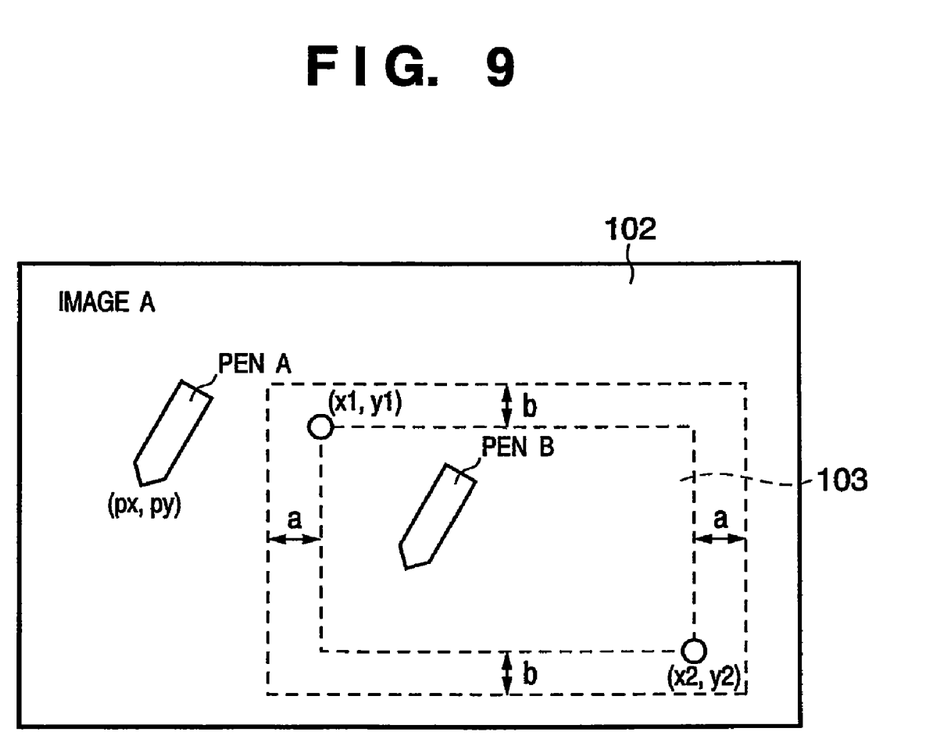
FIG. 9 is a diagram illustrating a process of determining whether or not, if the two pens A and B are designating positions in areas of images A and B, respectively, the pen A is designating a position in the area of image B, in accordance with the second embodiment.

FIG. 9 is a diagram illustrating a process of determining whether or not, in a case where the two pens A and B are designating positions in the areas of images A and B, respectively, and the pen A is designating a position in the area of image B.

As in the case of FIG. 4, described above, the upper left position of the area of image B 103 is defined as (x1, y1) and its lower right position is defined as (x2, y2). A position designated using the pen 104 is defined as (px, py). If (x1−a)<px<(x2+a) and (y1−b)<py<(y2+b), then the CPU judges that the position designated using the pen 104 is inside the area of image B 103. Reference characters a and b denote preset values that may be different or the same.

In step S49, the CPU 505 determines whether or not any position has been designated using the pen A. If any position has been designated using the pen A, then in step S50, the CPU 505 transmits coordinates data on the position designated using the input pen A, to the PC 106. In step S51, the CPU 505 determines whether or not any position has been designated using the pen B. If any position has been designated using the pen B, then in step S52, the CPU 505 transmits coordinates data on the position designated using the input pen B, to the PC 107.

In step S51, if no position has been designated using the pen B, then the process proceeds to step S53. The CPU 505 then determines whether or not at least a preset time period t during which no input is given has elapsed. When the time period t has elapsed, the process proceeds to step S54 where the CPU 505 makes the image B 103 transparent (606 in FIG. 7).

In step S49, if no position has been designated using the pen A, the process proceeds to step S55. The CPU 505 then determines whether or not at least a preset time period t during which no input is given has elapsed. When the time period t has elapsed, the process proceeds to step S56 where the CPU 505 returns the image B 103 to its normal display from (605 in FIG. 7).

The description of a process executed on the basis of the continuous operation determining method 2 is omitted. This process can be executed as shown in the flowchart in FIG. 6 by detecting pen-up and-down operations of the pens A and B as shown in the above flowchart in FIG. 6.

In the above description, the image B 103 is made transparent by determining whether or not the position continuously designated using the pen 105 has entered the area of image B 103. However, the image B 103 may be made transparent by determining whether or not the distance between the position designated using the pen and the image B 103 is less than a predetermined value.

In the above description, the image B 103 is made translucent. However, the color of the image may be made lighter or thin, or the image may be patterned. Alternatively, the image B may remain displayed without having its transparency changed or may be made transparent.

In the above description, the image B 103 is made translucent or transparent with the image A 102 used as a main image. However, the image A 102 can be made translucent or transparent with the image B 103 used as a main image.

Thus, the second embodiment exerts effects described below. For example, the following case will be considered: when a plurality of windows are displayed so that the underlying (under) window is partly hidden by the overlying (above) window, an operation such as drawing is performed on the windows using respective positioning devices (pens or the like). If the position designated in the underlying window using the positioning device nears the hidden area, the overlying (above) window becomes translucent. A user can then continue the drawing while viewing the otherwise hidden underlying (under) window. Another user can continue to perform an operation on the overlying translucent window using the other positioning device.

The overlying (above) translucent window is then fully visualized when the position designated using the positioning device leaves the otherwise hidden area or when the continuous positioning operation using the positioning device is finished. This enables the image on the overlying window to be viewed normally.

The prevent invention may be implemented by directly or remotely supplying a system or apparatus with a software program that provides the functions of the above embodiments so that a computer in the system or apparatus can read and execute codes from the supplied program. In this case, any form other than the program may be used as long as it can provide the functions of the program. The present invention may be implemented by the program codes themselves installed in a computer to allow the computer to execute the functions and processes. That is, the present invention includes the computer program itself which is required to execute the functions and processes of the present invention. Any form other than the program may be used as long as it can provide the functions of the program; possible forms include object codes, a program executed by an interpreter, and script data supplied to an OS.

Examples of a storage medium supplying a program to the system include a floppy (registered trade mark) disk, a hard disk, an optical disk, a magneto-optic disk, an MO, a CD-ROM, a CD-R, a CD-RW, a magnetic tape, a nonvolatile memory card, a ROM, and a DVD (DVD-ROM or DVD-R). The program can also be supplied to the system by using a browser in a client computer to connect to a home page on the Internet and downloading the computer program itself of the present invention or its file from the home page into a storage medium such as a hard disk; the file is obtained by compressing the computer program and includes an automatic install function. This can also be achieved by dividing the program codes constituting the program of the present invention into a plurality of files and downloading these files from different home pages. That is, the claims of the present invention include a WWW server that allows a plurality of users to download the program files allowing a computer to execute the functions and processes of the present invention.

The present invention can also be implemented by encrypting and storing the program of the present invention in storage media such as CD-ROMs, distributing the storage media to users, allowing users meeting predetermined conditions to download key information required for deciphering, from a home page on the Internet, and allowing the users to use the key information to execute and install the encrypted program into their computers.

The functions of the above embodiments are also executed not only by allowing a computer to execute the read program but also by allowing an OS operating on the computer to execute a part or all of the actual process on the basis of instructions from the program.

The functions of the above embodiments are also executed by writing the program read from a storage medium to an expanded board inserted into a computer or an expanded unit connected to the computer and then allowing a CPU or the like provided in the expanded board or unit to execute a part or all of the actual process on the basis of instructions from the program.

The present invention is not limited to the above embodiments, and various changes and modifications can be made thereto within the spirit and scope of the present invention. Therefore, to apprise the public of the scope of the present invention, the following claims are made.

This application claims the benefit of Japanese Patent Application No. 2005-057962, filed on Mar. 2, 2005, which is hereby incorporated by reference herein in its entirety.

What is claimed is:

1. A display control apparatus for controlling a display on a screen of a display unit, comprising:
 a piece of hardware, including a programmable processor;
 a discrimination unit configured to discriminate a designated position, by a positioning operation using an input pen, on the screen of the display unit;
 an issue unit configured to determine a window containing the designated position discriminated by said discrimination unit and to issue coordinates data indicating the designated position on the window;
 a first determination unit configured to determine whether or not a continuous positioning operation using the input pen is being performed in a first window, wherein said first determination unit
  determines that the continuous positioning operation is being performed when a positioning operation using the input pen is performed within a preset time period after the last positioning operation using the input pen, and
  determines that the continuous positioning operation has ended if no positioning operation is performed in the preset time period or if the distance between the latest pen-up position of the input pen and the current designated position by the input pen is larger than a preset value;
 a second determination unit configured to determine, in a case where said first determination unit determines that the continuous positioning operation is being performed in the first window, whether or not the designated position discriminated by said discrimination unit is located within a second window that is displayed to cover a part of the first window;
 a display change unit configured to make the second window transparent in a case where said second determination unit determines that the designated position discriminated by said discrimination unit is located within the second window; and
 a coordinates output unit configured to output, to the first window, coordinates data indicating the designated position discriminated by said discrimination unit in the second window that is made transparent by said display change unit, as long as said first determination unit determines that the continuous positioning operation is being performed,
 wherein said programmable processor functions as at least one of said discrimination unit, said first and second determination units, said display change unit and said coordinates output unit.

2. The apparatus according to claim 1, further comprising a recovery unit configured to recover an original displaying state of the second window if the designated position discriminated by said discrimination unit is located outside the second window that is made transparent by said display change unit.

3. The apparatus according to claim 1, further comprising a unit configured to recover the original displaying state of the second window in a case where said first determination unit determines that the continuous positioning operation is ended.

4. The apparatus according to claim 1, wherein said second determination unit determines that the designated position discriminated by said discrimination unit is located within the second window in a case in which the designated position is located on a boundary area having a predetermined width around the second window that is displayed to cover a part of the first window.

5. A display control apparatus for controlling a display on a screen of a display unit, comprising:
 a piece of hardware, including a programmable processor;
 a discrimination unit configured to discriminate positions designated by positioning operations using one or more input pens, on the screen of the display unit;
 an issue unit configured to determine windows to which the respective positions discriminated by said discrimination unit belong and to issue coordinates data indicating the positions to the respective windows;
 a first determination unit configured to determine whether or not a continuous positioning operation using a first one of the one or more input pens is being performed in a first window, wherein said first determination unit
  determines that the continuous positioning operation is being performed when a positioning operation using the first input pen is performed within a preset time period after the last positioning operation using that input pen, and
  determines that the continuous positioning operation has ended if no positioning operation is performed in the preset time period or if the distance between the latest pen-up position of that input pen and the current designated position by that input pen is larger than a preset value;
 a second determination unit configured to determine, in a case where said first determination unit determines that the continuous positioning operation using the first input pen is being performed in the first window, whether or not the position designated by a positioning operation using that input pen, discriminated by said discrimination unit, is located within a second window that is displayed to cover a part of the first window;
 a display change unit configured to make the second window transparent, in a case where said second determination unit determines that the position discriminated by said discrimination unit is located within the second window;
 a first coordinates output unit configured to output, to the first window, coordinates data indicating the position designated by the positioning operation using the first input pen and discriminated by said discrimination unit, in the second window that is made transparent by said display change unit, as long as said first determination unit determines that the continuous positioning operation using that input pen is being performed; and a second coordinates output unit configured to output, to the second window, coordinates data indicating the position designated by a positioning operation using a second one of the one or more input pens and discriminated by said discrimination unit, in the second window that is made transparent by said display change unit, wherein said programmable processor functions as at least one of said discrimination unit, said first and second determination units, said display change unit and said first and second coordinates output units.

6. The apparatus according to claim 5, further comprising a recovery unit configured to recover an original displaying state of the second window in a case where the position designated using the first input pen and discriminated by said discrimination unit is located outside the second window.

7. The apparatus according to claim 5, further comprising a unit configured to recover an original displaying state of the second window in a case where said first determination unit determines that the continuous positioning operation is ended.

8. The apparatus according to claim 5, wherein said second determination unit determines that the designated position discriminated by said discrimination unit is located within the second window in a case where the designated position is located on a boundary area having a predetermined width around the second window that is displayed to cover a part of the first window.

9. A display control method for controlling a display on a screen of a display unit, the method comprising the following steps performed by a computer:

a discriminating step of discriminating a designated position, by a positioning operation using an input pen, on the screen of the display unit;

a step of determining a window to which the position discriminated in said discriminating step belongs and issuing coordinates data indicating the position to the window;

a first determination step of determining whether or not a continuous positioning operation using the input pen is being performed in a first window, wherein said first determination step includes determining that the continuous positioning operation is being performed when a positioning operation using the input pen is performed within a preset time period after the last positioning operation using the input pen, and determining that the continuous positioning operation has ended if no positioning operation is performed in the preset time period or if the distance between the latest pen-up position of the input pen and the current designated position by the input pen is larger than a preset value;

a second determination step of, in a case where it is determined in said first determination step that the continuous positioning operation is being performed in the first window, determining whether or not the position discriminated in said discriminating step is located within a second window that is displayed to cover a part of the first window;

a display change step of making the second window transparent in a case where it is determined in said second determination step that the position discriminated in said discriminating step is located within the second window; and a step of issuing, to the first window, coordinates data indicating the position discriminated in said discriminating step in the second window that is made transparent in said display change step, as long as it is determined in said first determination step that the continuous positioning operation is being performed.

10. The method according to claim 9, further comprising a step of recovering an original displaying state of the second window in a case where the position discriminated in said discriminating step is located outside the second window that is made transparent in said display change step.

11. The method according to claim 9, further comprising a step of recovering the original displaying state of the second window in a case where it is determined in said first determination step that the continuous positioning operation is ended.

12. The method according to claim 9, wherein it is determined in said second determination step that the designated position discriminated in said discriminating step is located within the second window in a case in which the designated position is located on a boundary area having a predetermined width around the second window that is displayed to cover a part of the first window.

13. A non-transitory computer-readable storage medium storing a program for causing a computer to implement the display control method according to claim 9.

14. A display control method for controlling a display on a screen of a display unit, the method comprising the following steps performed by a computer:

a discriminating step of discriminating positions designated by positioning operations using one or more input pens on the screen of the display unit;

a step of determining windows to which the respective positions discriminated in said discriminating step belong and issuing coordinates data indicating the positions to the respective windows;

a first determination step of determining whether or not a continuous positioning operation using a first one of the one or more input pens is being performed in a first window, wherein said first determination step includes determining that the continuous positioning operation is being performed when a positioning operation using the first input pen is performed within a preset time period after the last positioning operation using that input pen, and determining that the continuous positioning operation has ended if no positioning operation is performed in the preset time period or if the distance between the latest pen-up position of that input pen and the current designated position by that input pen is larger than a preset value;

a second determination step of, in a case in which it is determined in said first determination step that the continuous positioning operation using the first input pen is being performed in the first window, determining whether or not the position designated by a positioning operation using that input pen discriminated in said discriminating step is located within a second window that is displayed to cover a part of the first window;

a display change step of making the second window transparent in a case where it is determined in said second determination step that the position discriminated in said discriminating step is located within the second window;

a step of issuing, to the first window, coordinates data indicating the position designated by the positioning operation using the first input pen and discriminated in said discriminating step, in the second window that is made transparent in said display change step, as long as it is determined in said first determination step that the continuous positioning operation using that input pen is being performed; and a step of issuing, to the second window, coordinates data indicating the position designated by a positioning operation using a second one of the one or more input pens and discriminated in said discriminating step, in the second window that is made transparent in said display change step.

15. The method according to claim 14, further comprising a step of recovering an original displaying state of the second window in a case where the position designated using the first input pen and discriminated in said discriminating step is located outside the second window.

16. The method according to claim 14, further comprising a step of recovering the original displaying state of the second window in a case where it is determined in said first determination step that the continuous positioning operation is ended.

17. The method according to claim 14, wherein it is judged in said second determination step that the designated position discriminated in said discriminating step is located within the second window in a case in which the designated position is located on a boundary area having a predetermined width around the second window that is displayed to cover a part of the first window.

18. A non-transitory computer-readable storage medium storing a program for causing a computer to implement the display control method according to claim 14.

* * * * *